United States Patent [19]
Benson

[11] 3,862,673
[45] Jan. 28, 1975

[54] SHOCK ABSORBING ATTACHMENT UNIT FOR A VEHICLE RESTRAINT BELT

[75] Inventor: James C. Benson, Rochester, N.Y.

[73] Assignee: General Motors Corporation, Detroit, Mich.

[22] Filed: Mar. 23, 1973

[21] Appl. No.: 344,184

[52] U.S. Cl. .............................. 188/1 C, 297/386
[51] Int. Cl. ............................................: F16f 7/12
[58] Field of Search .......... 188/1 C; 293/70, 85, 89; 297/386; 280/150 SB

[56] References Cited
UNITED STATES PATENTS

| | | | |
|---|---|---|---|
| 2,724,463 | 11/1955 | Becker | 188/1 C |
| 3,130,819 | 4/1964 | Marshall | 188/1 C |
| 3,361,475 | 1/1968 | Villiers | 188/1 C |
| 3,582,133 | 6/1971 | DeLavenne | 188/1 C |
| 3,705,740 | 12/1972 | Shiomi et al. | 188/1 C |

Primary Examiner—Duane A. Reger
Attorney, Agent, or Firm—J. A. Kushman

[57] ABSTRACT

An attachment unit for securing a vehicle body occupant restraint belt to a fixed vehicle body portion in a shock absorbing manner by way of a flexible cable wrapped around a resilient member in a generally helical configuration. The resilient member is elongated and has an annular outer surface defining a helical groove which receives and positions the cable. The ends of the cable are formed into loops so as to allow respective attachment thereof to the fixed vehicle body portion and to the restraint belt. Belt tension during a vehicle impact tensions the cable and resiliently deforms the resilient member to thus lessen the shock a belted occupant is subjected to during the impact. A central metallic core of the resilient member provides rigidity during the deformation of this member. An elongated cover of an annular configuration receives the resilient member and the helical portion of the cable to conceal these components and provide the attachment unit with an aesthetically appealing appearance.

1 Claim, 4 Drawing Figures

PATENTED JAN 28 1975 3,862,673

SHOCK ABSORBING ATTACHMENT UNIT FOR A VEHICLE RESTRAINT BELT

BACKGROUND OF THE INVENTION

This invention relates generally to an attachment unit for securing a vehicle body restraint belt to a fixed vehicle body portion in a shock absorbing manner.

Many prior art references have taught the concept of attaching a vehicle body restraint belt to a fixed vehicle body portion in a shock absorbing manner so as to lessen the shock a belted occupant is subjected to during a vehicle impact. Generally, these references have disclosed attachment units utilizing pneumatic cylinder and piston arrangements or plastically deformable attachment members which provide the shock absorption.

SUMMARY OF THE INVENTION

This invention provides an attachment unit for securing a vehicle occupant restraint belt to a fixed vehicle body portion in a shock absorbing manner by way of an elongated flexible member wrapped around an elongated resilient member in a helical configuration. The resilient member has a generally annular outer surface defining a helical groove which receives and positions the flexible member. The ends of the flexible member are respectively attachable to the restraint belt and to the fixed vehicle body portion so that belt tension during a vehicle impact tensions the flexible member and resiliently deforms the resilient member to thereby lessen the shock a belted occupant is subjected to during the impact. The resilient member may be of an elastic material, such as rubber, so that the absorbed energy is subsequently returned to the belt. Alternately, the resilient member may be of a viscoelastic material so that the attachment unit dissipates a portion of the shock energy absorbed during deformation of the resilient member. A central metallic core of the resilient member maintains the elongated configuration of this member during its deformation. An elongated cover of an annular configuration receives the resilient member and the helical portion of the cable so as to conceal these components and provide the attachment unit with an aesthetically appealing appearance.

BRIEF DESCRIPTION OF THE DRAWINGS

The objects, features and advantages of the present invention are readily apparent from the following detailed description of the preferred embodiment and the drawings in which.

DETAILED DESCRIPTION OF THE PREFERRED EMBODIMENT

Figure 1:
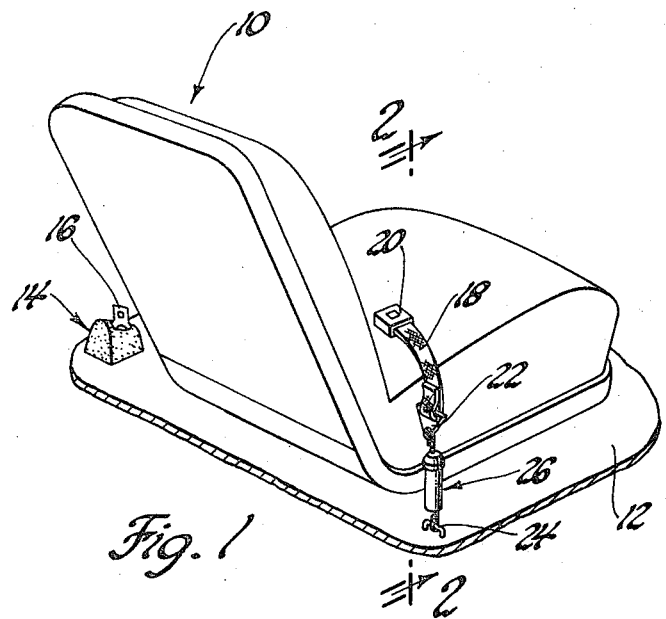
FIG. 1 is a perspective view of a vehicle body seat with an associated restraint belt secured to the vehicle body floor by way of an attachment unit according to this invention.

Referring to FIG. 1 of the drawings, a vehicle body seat generally indicated by 10 is mounted in a conventional manner on a vehicle body floor 12. On the left-hand side of seat 10, a vehicle body belt retractor 14 selectively winds and unwinds a hidden length of restraint belt whose free end attaches a D-ring 16. On the right-hand side of seat 10, a length of restraint belt 18 has a free end secured to a buckle 20 that is adaptable to receive and selectively attach the D-ring 16 so that the two lengths of belt cooperate to encircle a seated occupant in a restraining manner. The lower end of the belt 18 is looped through a triangular plate 22, and an attachment unit 26 secures this plate to an inverted U-shaped hook 24 on the vehicle body floor in a shock absorbing manner so as to lessen the shock a belted occupant is subjected to during a vehicle impact.

Figure 3:
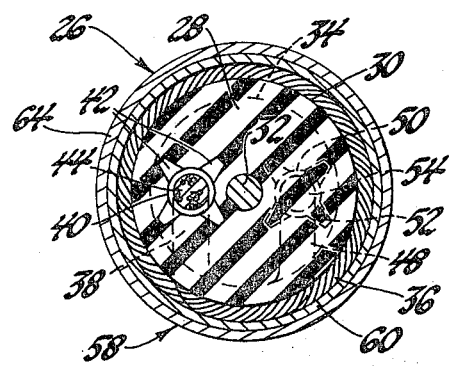
FIGS. 3 and 4 are cross-sectional views of the attachment unit taken respectively along lines 3—3 and 4—4 of FIG. 2.
Figure 4:
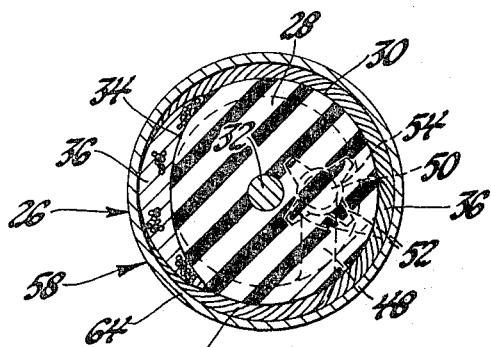
Figure 2:
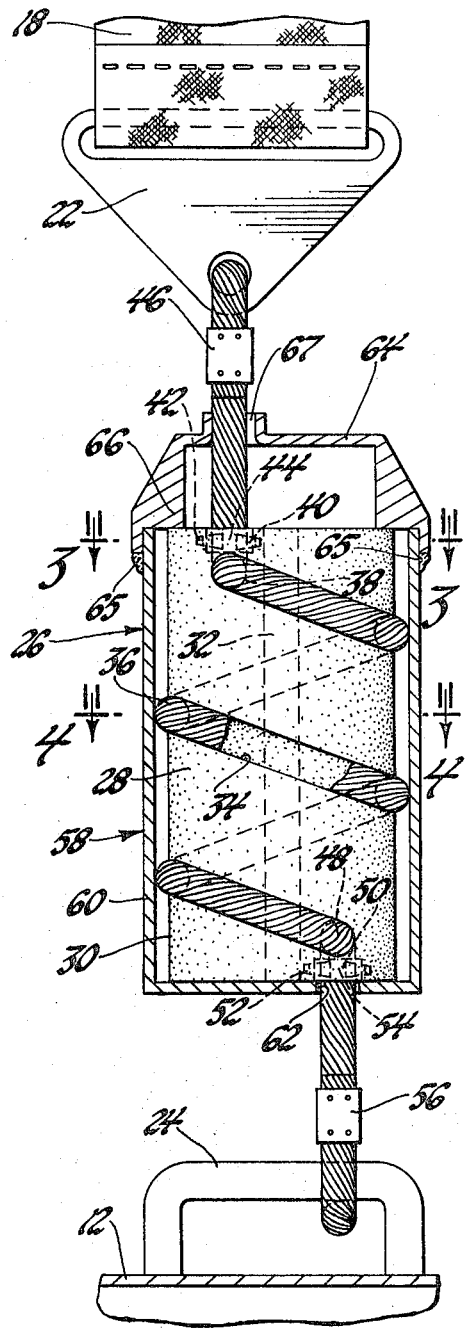
FIG. 2 is an enlarged sectional view taken along the longitudinal length of the attachment unit generally along line 2—2 in FIG. 1.

Referring additionally now to FIGS. 2 through 4, the attachment unit 26 includes an elongated resilient member 28 with an outer surface 30 of an elongated annular configuration. A central metal rod or core 32 is embedded within and extends between the opposite ends of the resilient member 28. A helical groove 34 in the outer surface of the resilient member encircles this core 32 in a concentric manner and extends generally between the opposite ends of the resilient member. A flexible cable 36 is received by the groove 34 and thus winds around the resilient member 28 in a helical configuration. At the upper end of this helical configuration, a portion 38 of the cable extends inwardly to the lower side of a cable guide 40 which is embedded within the resilient member. This cable guide has star-shaped positioning projections 42 that maintain the guide in position. A portion 44 of the cable extends upwardly from cable portion 38, through the cable guide 40, and outwardly of the attachment unit at a location that is eccentric relative to the circular cross section of the resilient member 28. Above the attachment unit, the cable is looped through plate 22 and back onto itself so as to be secured in position by way of a suitable securement 46. The lower end of cable 36 includes a portion 48 which extends inwardly to the upper side of a cable guide 50 embedded within the lower end of resilient member 28 and having star-shaped positioning projections 52 maintaining the guide in position. A portion 54 of cable 36 extends downwardly through cable guide 50 and outwardly of the attachment unit at a location that is eccentric relative to the circular cross section of resilient member 28 and is located on the opposite side of core 32 from the upper portion 44 of the cable. Below the attachment unit, the cable is looped through hook 24 and back onto itself so as to be secured in position by way of a suitable securement 56.

A cover 58 of attachment unit 26 includes a lower cup portion 60 which receives the resilient member 28 and the helical portion of cable 36. An aperture 62 in the lower end of this cup portion receives the lower portion 54 of the cable as it extends downwardly outward of the attachment unit. An upper cap portion 64 of the cover fits over the cup portion 60 to close the upper end therof and is secured in position in a suitable manner as by welds 65. The cap portion includes an annular flange 66 that engages the outer periphery of the upper end of resilient member 28 so as to position this member in the cup portion 60 as shown in FIG. 2. The cap portion 64 defines a flanged aperture 67 through which the upper portion 44 of the cable extends upwardly outward of the attachment unit. This cover 58 thus conceals the resilient member 28 and the helical portion of the cable 36 to provide the attachment unit 26 with an aesthetically appealing appearance.

When the vehicle associated with seat 10 is subjected to an impact condition while carrying a belted occupant on the seat, the restraint belt 18 will be tensioned as the occupant moves forwardly on seat 10 under the impetus of inertial forces associated with the impact. This belt tension will also tension cable 36 and cock the attachment unit due to the eccentric manner in which cable portions 44 and 54 extend from the attachment unit on opposite sides of core 32. The cable tension tends to elongate the helical configuration of the cable and thereby deforms the resilient member 28 so as to lessen the shock imparted to the belted occupant. Due to the cocked condition of the attachment unit, the resilient member is deformed so that its FIG. 2 longitudinal section assumes a slightly parallelogram configuration instead of only elongating the rectangular configuration of the resilient member. The metallic core 32 of the resilient member 28 will maintain the longitudinal configuration of this resilient member while the deformation occurs. The cable guides 40 and 50 will insure that the cable does not sever the upper and lower portions of the resilient member adjacent its end portions.

The cable 36 may be wound around the resilient member 28 after the resilient member is molded to the configuration shown or may be embedded within the resilient member as this member is molded. Also, the location of the cable 36 relative to the outer surface 30 of the resilient member may be varied to some degree. The cable may be embedded within the resilient member as this member is molded so as to be located adjacent this surface but hidden from sight. It may be located partly above and partly below this surface as shown so that the resilient member provides an integral means for positioning the cable while still allowing the cable to be wound into position after molding of the resilient member. If this latter manner is chosen, it is of course obvious that suitable passages must be formed in the resilient member so as to receive the cable portions 38, 44, 48 and 52 adjacent the upper and lower ends of member 28. The cable 36 may also be wound onto surface 30 with suitable positioning means such as lugs embedded in member 28 and extending outwardly thereof so as to maintain the cable in its helical configuration.

The resilient member 28 may be formed of an elastic material such as rubber so that the energy absorbed by this member during its deformation will subsequently be transferred back to cable 36 as the resilient member returns to its original undeformed condition. It is also possible for the resilient member 28 to be formed from a viscoelastic material. The nature of a viscoelastic material is that the energy with which the material resists shock deformation is greater than the energy the material expends in returning to its original configuration due to internal losses. Thus if a viscoelastic material is utilized, the resilient member will not transfer all of the absorbed energy back to cable 36 as this member returns to its original undeformed condition.

It is believed evident from the foregoing description that this invention provides an improved shock absorbing attachment unit for a vehicle body occupant restraint belt which is economical to manufacture and effective in use.

What is claimed is:

1. A shock absorbing attachment unit for a vehicle body restraint belt comprising:

an elongated resilient member having a generally annular outer surface and a central metallic core providing rigidity to this member, the resilient member defining a groove along its outer surface extending generally between the opposite ends of this member with a generally helical configuration;

a flexible cable wrapped around the resilient member within the helical groove thereof so as to extend between the opposite ends of the resilient member with a generally helical configuration;

means adaptable to attach the respective ends of the cable to a fixed vehicle body portion and to an occupant restraint belt so that belt tension during a vehicle impact tensions the cable and resiliently deforms the resilient member to thereby lessen the shock a belted occupant is subjected to during the impact; and an elongated cover of an annular configuration which receives the resilient member and the helical portion of the cable so as to conceal these components and thus provide the attachment unit with an aesthetically appealing appearance.

* * * * *